United States Patent
Westhoff et al.

(10) Patent No.: US 6,568,691 B1
(45) Date of Patent: May 27, 2003

(54) METHOD AND APPARATUS FOR FORMING CAST MEMBERS HAVING EMBEDDED BOOT TYPE GASKETS

(75) Inventors: James A. Westhoff, Langhorne, PA (US); James A. Kelly, Upper Black Eddy, PA (US)

(73) Assignee: Poly-Tec Products, Inc., Tullytown, PA (US)

( * ) Notice: Subject to any disclaimer, the term of this patent is extended or adjusted under 35 U.S.C. 154(b) by 0 days.

(21) Appl. No.: 09/533,424

(22) Filed: Mar. 22, 2000

Related U.S. Application Data

(60) Provisional application No. 60/125,860, filed on Mar. 24, 1999.

(51) Int. Cl.[7] ............................................... F16L 5/02
(52) U.S. Cl. .................. 277/604; 277/606; 277/617; 277/625; 277/626; 277/627
(58) Field of Search ................... 277/314, 315, 277/316, 602, 604, 607, 608, 609, 616, 617, 625, 626, 627; 264/275

(56) References Cited

U.S. PATENT DOCUMENTS

| | | | | |
|---|---|---|---|---|
| 3,758,066 A | * | 9/1973 | Skinner et al. | 249/95 |
| 3,796,406 A | * | 3/1974 | Ditcher | 249/11 |
| 4,103,901 A | * | 8/1978 | Ditcher | 277/606 |
| 5,248,154 A | * | 9/1993 | Westhoff et al. | 277/606 |
| 5,286,040 A | * | 2/1994 | Gavin | 277/606 |
| 5,299,884 A | * | 4/1994 | Westhoff et al. | 404/25 |
| 5,529,312 A | | 6/1996 | Skinner et al. | 277/9.5 |
| 5,741,015 A | * | 4/1998 | Skinner | 277/559 |
| 5,941,535 A | * | 8/1999 | Richard | 277/606 |

OTHER PUBLICATIONS

The Concrete Producer. Feb., 1999, pp. 5, 19–20 and 49–51.

\* cited by examiner

Primary Examiner—Anthony Knight
Assistant Examiner—Alison K. Pickard
(74) Attorney, Agent, or Firm—Volpe and Koenig, P.C.

(57) ABSTRACT

A molded annular gasket is placed upon a mandrel for embedment of its annular-shaped embedment portion within an opening in a cast member. After the cast member has been cured and removed from a molding assembly, including the mandrel, the pipe attachment end of the gasket is pulled through the center of the gasket so that its pipe attachment end extends beyond the embedment end, to facilitate the placement of a take-down clamp which secures the pipe attachment end to a pipe inserted there through thereby providing a fluid-tight joint. The mandrel is preferably a one-piece member. The gasket may have a cylindrical or conical-shaped intermediate portion provided with spaced-apart annular projections at the pipe attachment end, between which the takedown clamp is arranged.

1 Claim, 7 Drawing Sheets

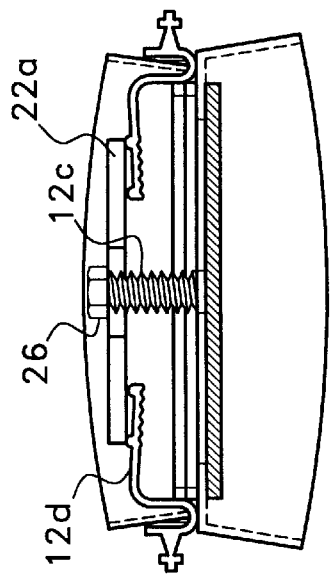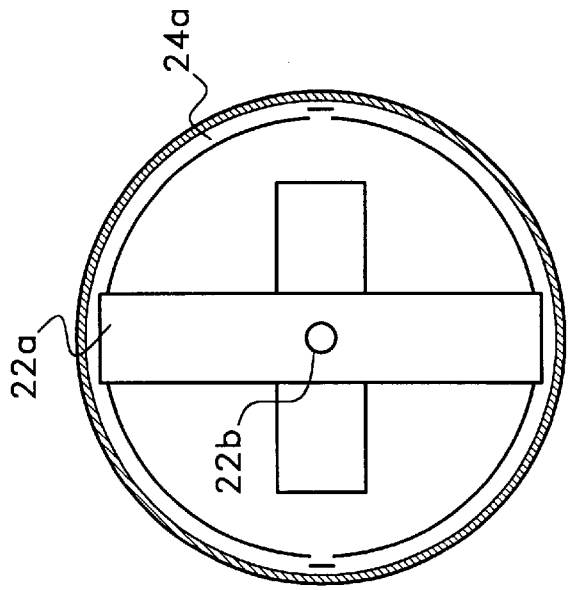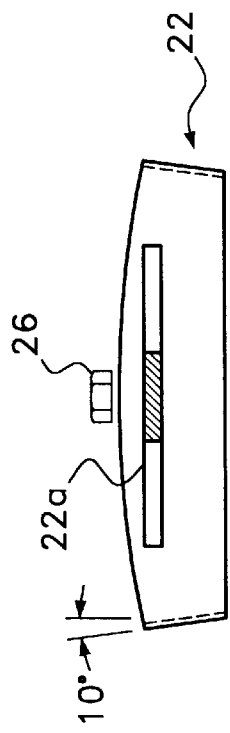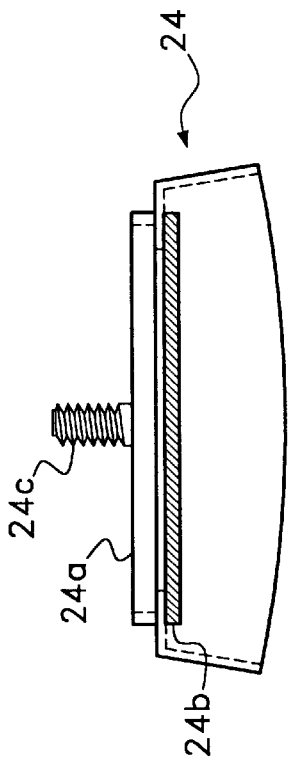

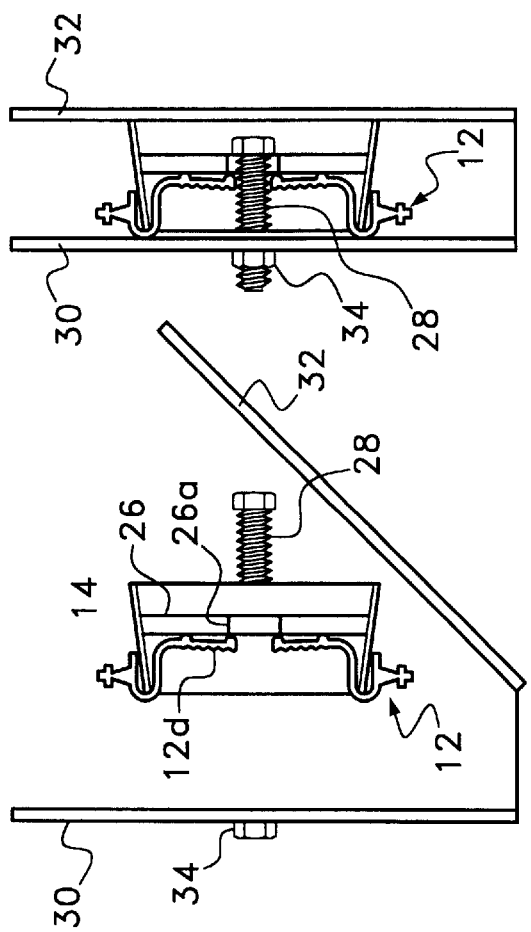

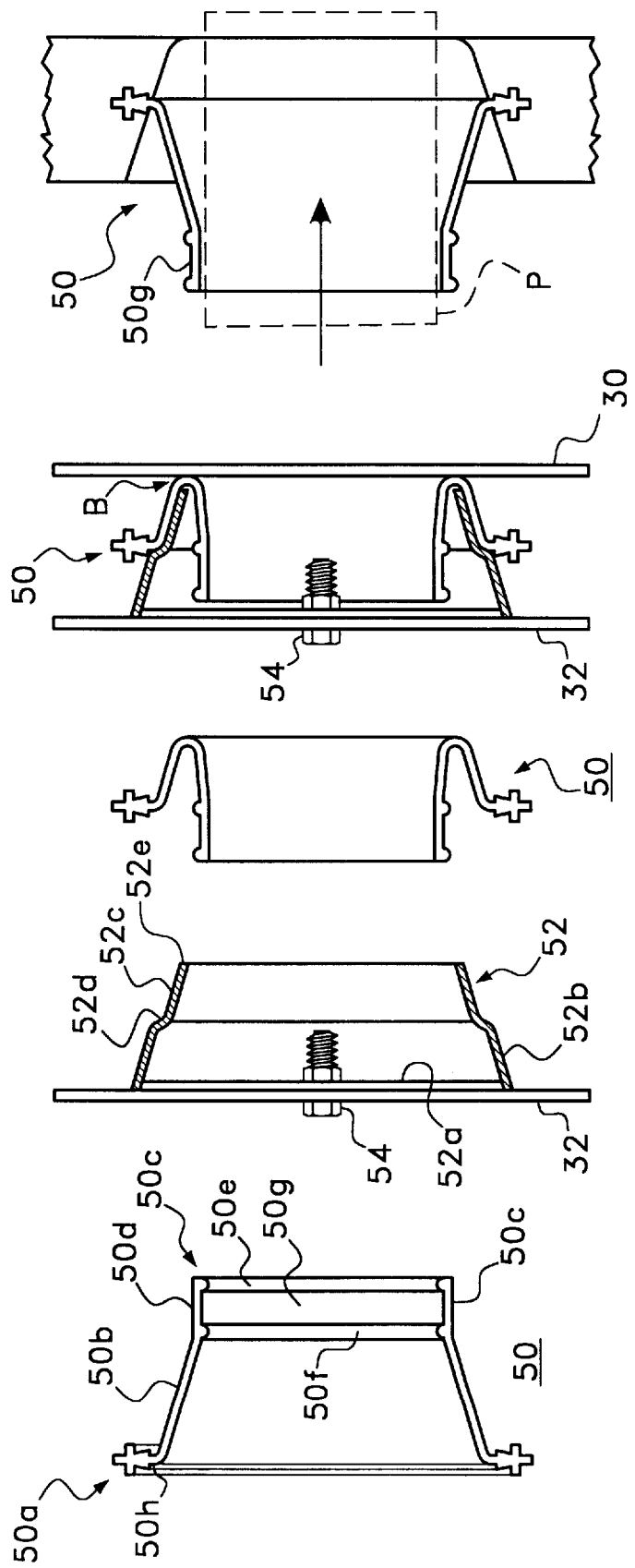

METHOD AND APPARATUS FOR FORMING CAST MEMBERS HAVING EMBEDDED BOOT TYPE GASKETS

This application claims the benefit of Provisional Application No. 60/125,860 filed, Mar. 24, 1999.

FIELD OF THE INVENTION

The present invention relates to cast members having gaskets embedded therein and more particularly a novel method and apparatus for producing cast members having cast-in gaskets of a boot design which are uniquely adapted for use in cast members having openings of reduced size.

BACKGROUND OF THE INVENTION

Cast members, such as, for example, manhole assemblies, have been traditionally used in sewage systems and networks and the like and are comprised of manhole assemblies having openings each adapted to receive a pipe in order to provide for inflow and outflow of liquid. It is conventional to provide gaskets within the aforesaid openings which cooperate with the pipe pushed therethrough to form a watertight seal, both the advantages and necessities for a watertight seal being well known in such sewage systems and the like.

With the constant desire to reduce the cost of both the manufacturing and materials employed in the production of cast members being ever present, one of the traditional approaches has been to produce gaskets of reduced size and hence reduced rubber (or rubberlike) content. One such gasket is described in U.S. Pat. No. 5,529,312, which patent teaches a gasket having a boot portion which is folded over to lie against a main gasket portion preparatory to casting. The gasket is placed upon a mandrel secured to one of the walls forming the mold assembly. The wall is moved to the closed position whereupon the cast material typically concrete) is poured into the mold. The mold assembly is opened after the cast material has cured. The boot portion is then unfolded preparatory to use. A pipe is pushed through the gasket including the boot portion. A steel clamp is placed around the boot portion to provide a watertight seal.

In order to reduce the amount of rubber utilized in the gasket disclosed in the aforementioned '312 patent, the overall size of its opening may be reduced; however, in order to provide a capability of controlling opening size, permissible angular deflection and permissible redial deflection, the only parameter of the '312 gasket which may be regulated is gasket thickness.

It is therefore extremely desirable to provide a gasket which is capable of controlling opening size, and angular and radial deflection through variation of a gasket parameter other than gasket thickness.

BRIEF DESCRIPTION OF THE INVENTION

The present invention is characterized by comprising method and apparatus for providing manhole assemblies and the like having a gasket embedded therein and which is designed to provide simplicity of manufacture, assembly and use.

The gasket, in one preferred embodiment of the present invention, comprises an annular-shaped base portion having integral anchoring means extending radially outward therefrom. The base portion is shaped to form a substantially U-shaped radius portion having an annular-shaped boot portion integrally joined to the radius portion and extending in a generally axial direction. The free end of the boot portion is provided with an annular head portion defining a clamp receiving portion. The gasket is made of a suitable rub or rubber-like material of a suitable durometer such as 40 to 45 durometer. In order to produce a cast member having the aforesaid gasket anchored therein, a mandrel assembly is provided, which assembly is comprised of an inner mandrel in the form of a substantially flat, disc-shaped member having a threaded member axially aligned with the center thereof and extending in a direction perpendicular to the mandrel surface. The inner mandrel may have a shape to fit the back area to the radius.

The outer mandrel, having a substantially truncated, hollow, conical configuration, cooperates with the inner mandrel to retain the gasket in the proper position within the mold assembly. The boot portion of the gasket is passed through the smaller diameter end of the outer mandrel until the radius portion engages the annular edge thereof. The inner mandrel is placed against the radius portion of the gasket on the convex side thereof. A star-shaped retaining member is placed upon the threaded member. The portion of the boot which would otherwise extend outwardly from the outer mandrel is bent in an inward radial direction, and is held down by the retaining member so as to be confined within the interior of the outer retaining ring in order to avoid any interference with the casting operation. The "pushed-inward" portion of the boot and the retaining member are held in place by a suitable threaded nut which threadedly engages the threaded member. The combined mandrel assembly and gasket is placed within a casting mold by conventional means.

The cast material is then poured into the mold. Once the cast material has been cured, the mold is opened, the mandrel assembly is disassembled and removed, enabling the inwardly curved boot portion to resume its normal, substantially annular-shaped configuration.

A pipe is pushed through the gasket to a depth sufficient to assure that the pipe extends beyond the free end of the boot, enabling the boot to be firmly secured to the pipe extending therethrough by means of stainless steel takedown clamp which is tightened to an extent sufficient to assure a water tight seal which meets and, in fact, surpasses ASTM specifications.

The above-described embodiment is extremely advantageous for use in flat wall structures as well as curved wall structures when the piping seal allows for the connector to be installed in a flat plane.

In applications where it is not possible to install a takedown clamp in a flat plane, as in the first embodiment, the present invention provides an alternative embodiment in which the boot portion is provided with a plurality of convolutions which enable the water stop portion of the gasket to be cast on a severe curve while the stainless steel clamp is capable of being fixed in a flat plane by serving as a resilient "buffer" region between the clamp and the radius portion. The installation of the second embodiment is substantially the same of that of the first.

Both of the described embodiments comprise radius portions which can be increased or decreased to provide for greater or lesser annular space between the inside opening of the entry hole and the outside diameter of the pipe. The radius further provides the desired tolerance for angular deflection of the pipe, as well as, off-set placement in both the vertical and horizontal positions which parameter is capable of being adjusted, in addition to and independently of gasket thickness.

OBJECTS OF THE INVENTION

BRIEF DESCRIPTION OF THE FIGURES

It is therefore one object of the present invention to provide novel method and apparatus for casting gaskets within opening in cast members a gasket being designed to control the clearance between the opening a pipe received therethrough, as well as, providing for both angular and radial displacement.

The above, as well as other objects of the present invention will become apparent when reading the accompanying description and drawings in which:

FIGS. 7a and 7b show side views of the inside half and outside half of the mandrel assembly for holding and centering a gasket within a mold assembly;

FIG. 8 shows the mandrel members of FIGS. 7a and 7b assembled and holding a gasket in position;

FIG. 9 shows a front view of the outside half of the mandrel member of FIG. 7a;

FIG. 10 shows still another mandrel assembly of the present invention arranged within a mold assembly and showing the swingable jacket in an open position;

FIG. 10a shows a top view of the mandrel assembly of FIG. 10;

FIG. 11 shows the mandrel assembly and mold assembly with the swingable jacket in the closed position;

FIG. 12 shows a view of the gasket molded into a cast member utilizing the mold assemblies of FIGS. 10 and 11 and having a pipe inserted therethrough;

FIG. 14 is a sectional view showing another molded gasket designed in accordance with the principles of the present invention; and FIGS. 14a–14c show the manner in which the gasket is embedded within a cast member thereafter prepared for receipt of a pipe.

DETAILED DESCRIPTION OF THE INVENTION AND PREFERRED EMBODIMENTS THEREOF

Figures 1, 2:
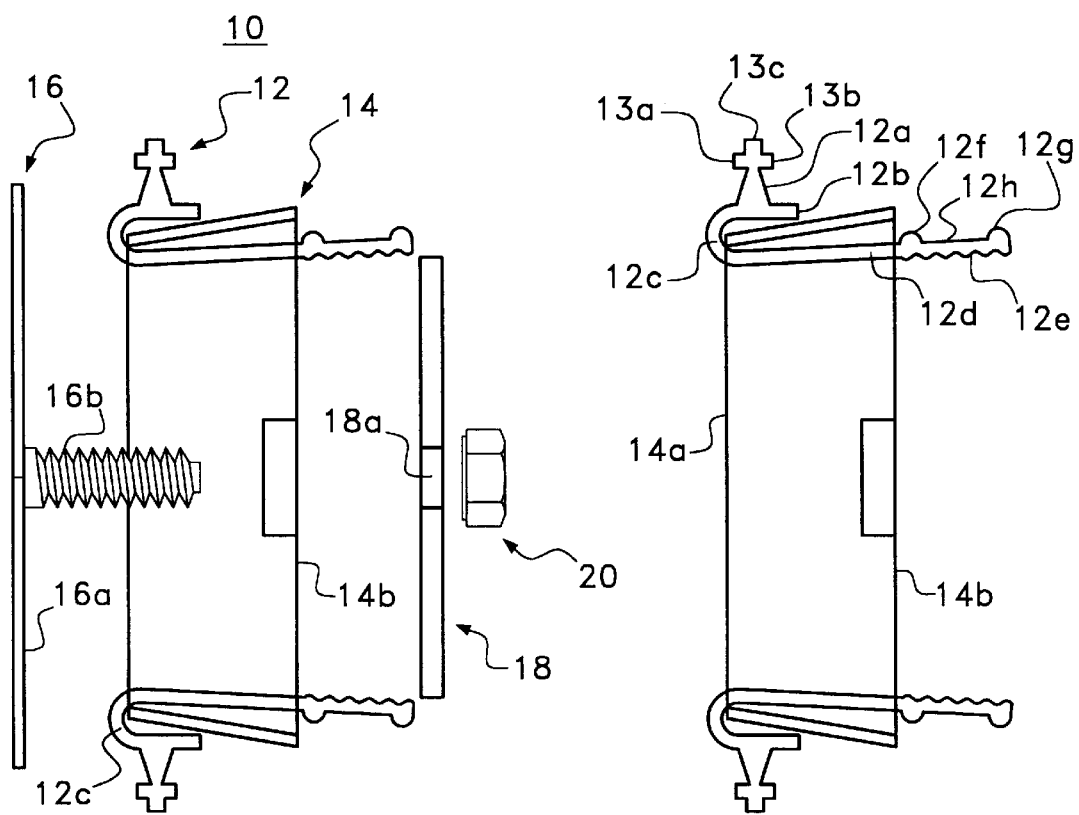
FIG. 1 is an exploded view showing the gasket (in cross-section) and mandrel assembly embodying the principles of the present invention.
FIG. 2 is a view showing the manner in which the gasket is initially mounted to one of the mandrels of the mandrel assembly preparatory to forming a cast member.

Making reference to FIGS. 1 and 2, there is shown therein a gasket/mandrel assembly 10 embodying the principles of the present invention and which is comprised of a gasket 12, an outer mandrel 14, an inner mandrel 16, a retainer cross 18 and a threaded nut 20.

Gasket 12 is an annular-shaped gasket having a base portion 12a of a tapered configuration, in cross section. Extending in an outward radial direction therefrom is an inverted, T-shaped anchoring means including integral projections 13a, 13b and 13c which, as will be more fully described hereinbelow, become embedded within the cast member to secure the gasket thereto.

Figure 4:
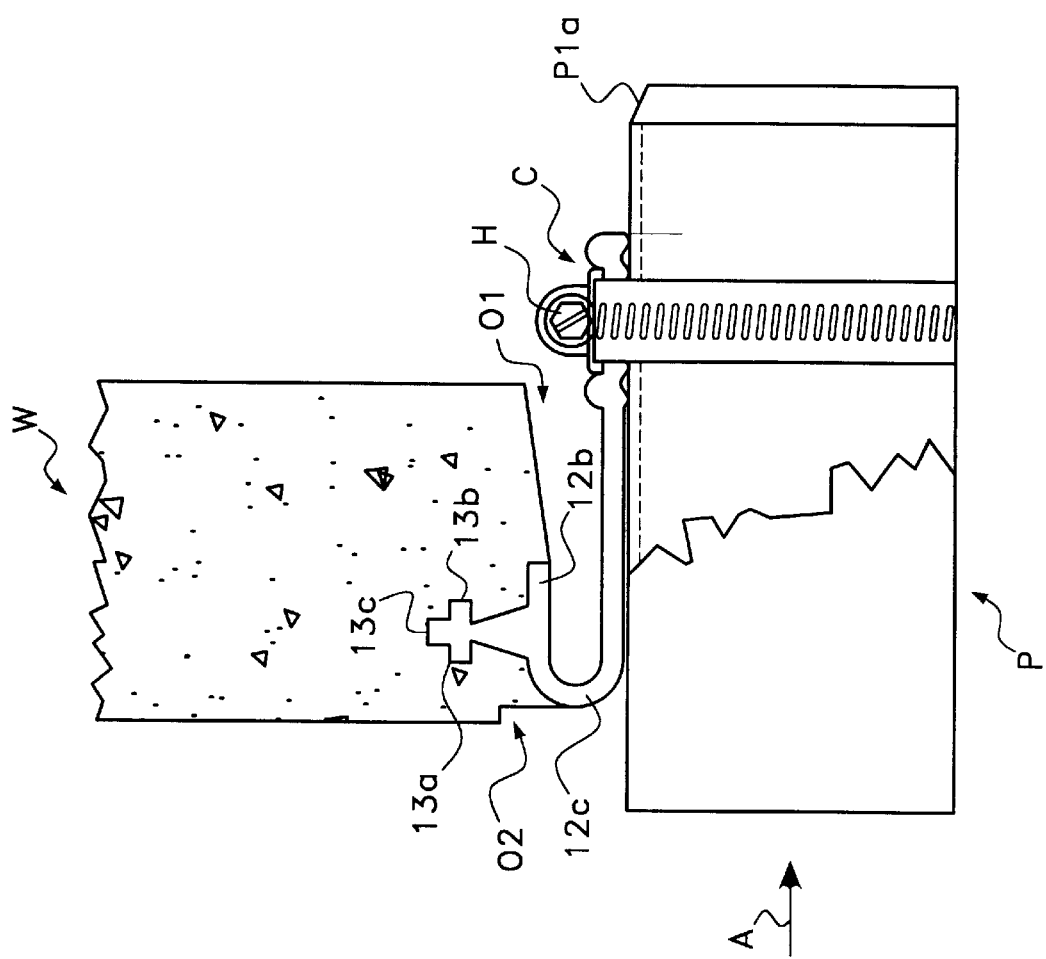
FIG. 4 is a view showing the manner in which the gasket boot is water tightly joined to a pipe extending therethrough.

Tapered portion 12a has integrally joined thereto, a base portion 12b which extends toward the right to provide a U-shaped, radius portion 12c which then, relative to FIGS. 1 and 2, extends generally toward the right to form an integral boot portion 12d having a shallow, corrugation-like interior surface portion 12e and a pair of rounded projections or beads 12f, 12g, which provide a recessed portion 12h therebetween, upon which a stainless steel take-down clamp C, shown in FIG. 4, is located, as will be more fully described.

The gasket is a molded (or extruded) gasket and is formed of a suitable rubber or rubber-like material of a suitable durometer to provide a rugged, resilient, compressible gasket member capable of providing excellent water-tight clamping between the gasket and a pipe, as will be more fully described hereinbelow.

The gasket is embedded into the cast member in the following manner:

The gasket 12 is first fitted upon the outer mandrel 14 by inserting the boot portion 12d through the narrow diameter opening 14a of the tapered, hollow, conical-shaped mandrel 14, until the boot extends beyond the right-hand end of mandrel 14 and through the larger diameter opening 14b, so that the concave internal peripheral portion of the radius 12c engages the annular left-hand edge of the outer mandrel, as shown in FIG. 2.

The inner mandrel which is comprised of a disc-shaped plate 16a having a threaded member 16b secured thereto, preferably by welding, and located at the central axis thereof, is placed so that the threaded member 16b passes through narrow diameter opening 14a until the plate 16a rests against radius portion 12c.

Figure 3:
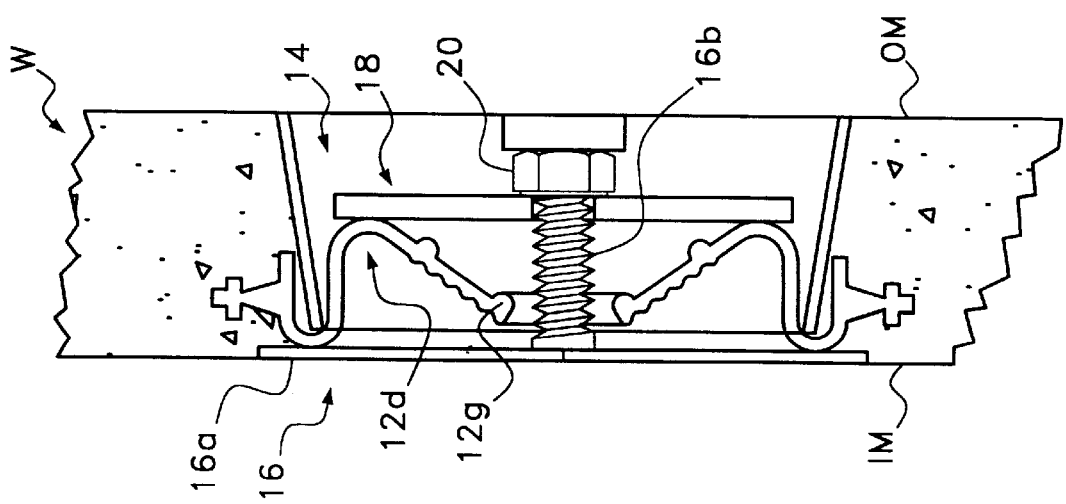
FIG. 3 is a view showing the manner in which the gasket, when assembled together with a mandrel assembly, is arranged within a mold assembly to form a cast member.

The annular-shaped boot portion 12d is manually forced inward in the manner shown in FIG. 3 so that the free end 12g thereof is positioned close to the plate 16a of the outer mandrel. The boot portion is forced inward in this manner in order to remove the boot portion from the region protruding out of the right-hand opening 14b of outer mandrel 14 in order that it not interfere with the casting operation. A star-shaped retainer member 18 has a central opening 18a which receives threaded member 16b which passes therethrough. Nut 20 is threaded onto threaded member 16b in the manner shown in FIG. 3 in order to retain the boot portion 12d forced inward and thus within the confines of the outer mandrel, as shown in FIG. 3.

The assembly shown in FIG. 1, when fully assembled in the manner shown in FIG. 3, is placed in a conventional manner within inner and outer mold members utilized to mold the cast member, such as a septic tank, manhole base, or other like cast concrete structure, the assembly being positioned so as to precisely locate an opening within the member being cast. The vertical walls OM and IM, shown in FIG. 3, represent the surfaces of outer mold and inner mold members which define the concrete wall being formed therebetween. When the gasket/mandrel assembly 10 is properly positioned between the mold members, the material (i.e., concrete) is poured into the hollow region defined by the mold members, forming a concrete wall W, as shown in FIG. 3.

Once the cast material has been set and cured, the inner and outer mold members are first removed. The threaded nut 20 is then removed from is threaded member 16b, whereupon the inner and outer mandrels 14 and 16 are removed. Due to the resilience and "memory" of the gasket 12, the boot portion 12d returns to its normal position, shown in FIG. 4. Outer mandrel 14 serves to define the surface of the opening in concrete wall W, shown to the right of gasket base 12b. The inner mandrel defines the recess O2 extending to the left of the gasket 12.

At a job site, a pipe P is inserted into the gasket by pushing the pipe in the direction of arrow A so that its right-hand end projects beyond the right-hand end of gasket 12. The pipe may be provided with a beveled portion P1a to facilitate insertion of the pipe into the boot portion.

When the pipe is properly positioned, a stainless steel take-down clamp C, which has been placed in the recess 12h (previously described), is tightened by turning the head H of a threaded member to secure the gasket boot portion 12d to the pipe P to provide a desired, water-tightness therebetween.

The radius portion 12c serves to "fill" the space between the opening and concrete wall W and the pipe P. For example, the radius of curvature of the radius section 12c may be increased or decreased according to the gap space between the pipe and the opening in wall W. In addition thereto, since the gasket is formed of resilient, compressible material, the gasket is yieldable to compensate for movement either upwardly or downwardly in the vertical direction or leftwardly or rightwardly in the horizontal direction to compensate for movement of the pipe. In addition, the gasket is capable of permitting the pipe to experience some angular deflection, either in a horizontal plane or a vertical plane (or both) due to the unique nature of the gasket, while at the same time, substantially "filling" the gap region between the outer diameter of the pipe and the inner diameter of the opening in the concrete wall W. The gap region may be "filled" by controlling the radius of radius portion 12c, the thickness of the gasket, or both.

The embodiment of FIGS. 1–4 is extremely advantageous for use in applications where the anchoring portion of the gasket lies in a substantially planar or flat region or lies within an opening having a radius of curvature, which is such that it will not cause the recess region 12h of the gasket to assume a curvature, thereby preventing the take-down clamp C from being positioned within a flat, planar region and thereby assuming a flat shape.

Figure 5:
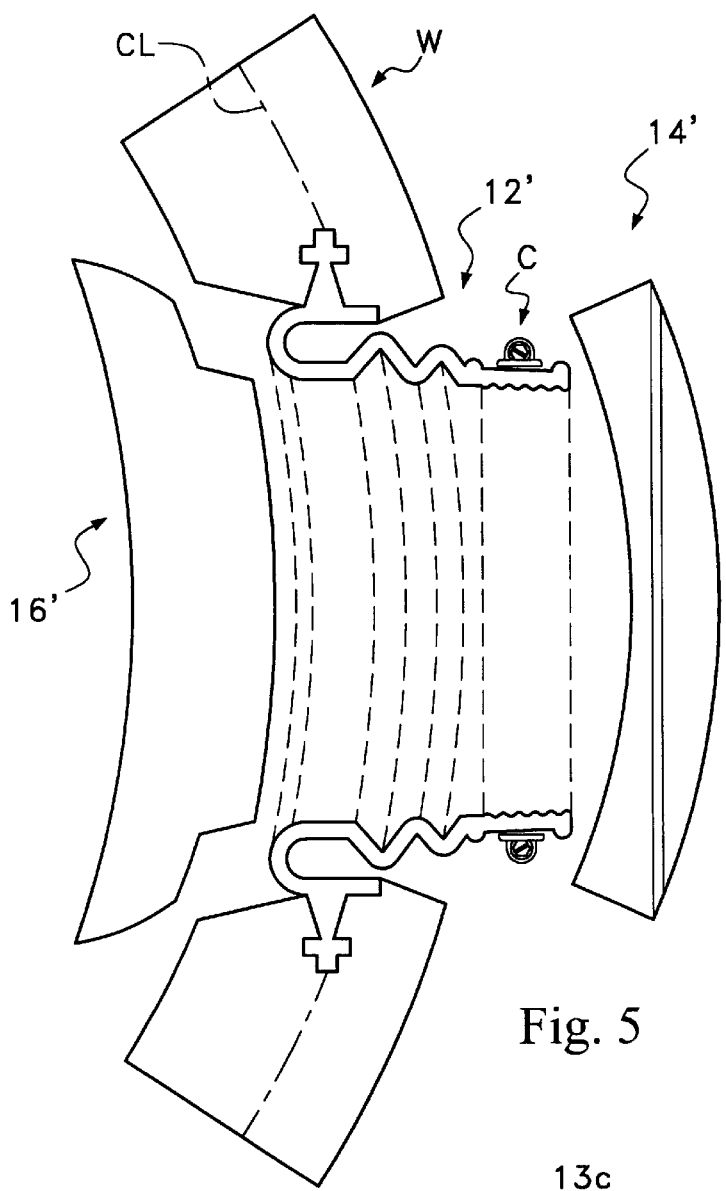
FIG. 5 is an exploded view another alternative embodiment of the gasket of the present invention and the mandrel assembly utilized therewith.
Figure 6:
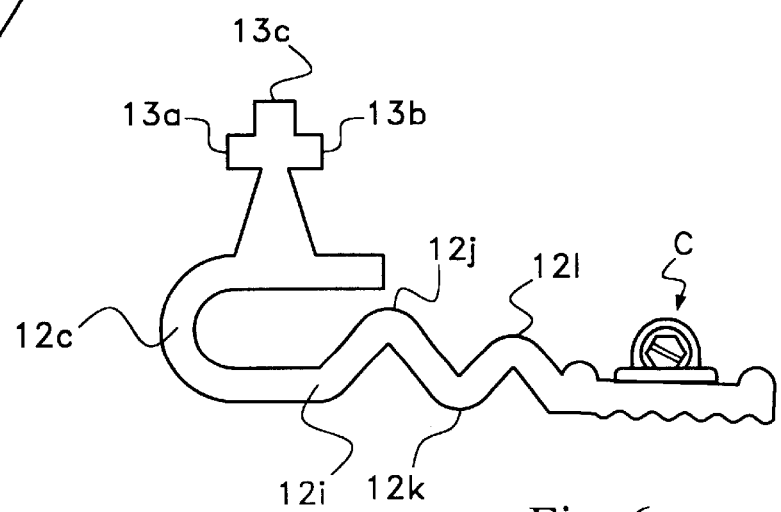
FIG. 6 is an enlarged sectional view showing the gasket of FIG. 5 in greater detail.

In applications where casting of the gasket in a flat plane is not possible, the gasket design 12', shown in FIGS. 5 and 6, may be employed. Gasket 12' is substantially the same as gasket 12, shown in FIGS. 1–4, except for the provision of several convolutions 12I, 12j, 12k, 12l, in the region between radius portion 12c and the end portion of the boot which receives the steel hold-down clamp C. The convolutions allow the water stop area of the connector to be cast in a curve, i.e., the anchoring portions 13a, 13b and 13c, while the clamp area of the connector remains a relatively flat plane to accept the stainless steel take-up clamp C. Placement mandrels 14', 16' are generally similar to those shown in FIG. 1, but require a radius to be built into the outside mandrel 14' and inside mandrel 16' in order to conform to the curvature of the concrete wall W, which curvature is represented by the dotted center line CL.

The inner and outer mandrels 14' and 16' are joined with the gasket 12' in a manner similar to that described hereinabove with regard to FIGS. 1–4. The boot portion of the gasket is manually bent inward in a manner similar to that shown in FIG. 3, utilizing a star-shaped retainer cross, similar to that shown in FIG. 3, for example, for retaining the boot portion in the "bent-in" state. Production of the cast member is thus quite similar, except for the fact that the anchoring portion of the gasket is embedded in a concrete wall having significant curvature (curve CL).

After the cast member has been set and cured, the mandrels 14' and 16' and the star retainer are removed (after unthreading the nut 20) whereupon the boot portion of the gasket retains its original configuration, shown in both FIGS. 5 and 6.

A pipe is inserted into the boot portion in a manner similar to that described in connection with FIG. 4 and the stainless steel take-down clamp C is appropriately tightened to provide an excellent water-tight seal between the boot and the pipe. The convolutions 12i–12l permit the intermediate portion of the boot to form deeper or shallower bends to compensate for the fact that the anchoring and base portion of the gasket follows the curvature CL, while enabling the stainless steel take-down clamp C to be maintained in a substantially flat plane.

In still another embodiment of the present invention, a pair of mandrel members 22 (outside half) and 24 (inside half) are provided for receiving, supporting and aligning a gasket within a mold assembly. Mandrels 22 and 24 are hollow, truncated conical-shaped members. The inside half 24 has an alignment ring 24a mounted upon a cross bar 24b. A coil thread 24c is secured to the cross bar 24b. The manner in which the gasket is mounted is by placing the gasket through the narrow opening end of mandrel (outside half) 22, shown in FIG. 8. The two members are then placed together in the manner shown in FIG. 8. The gasket retainer cross 22a is then placed upon the sleeve portion 12d of the gasket, the coil thread 24c being inserted into an opening 22b in the gasket retainer cross 22a. The alignment ring 24a is inserted into the opening within mandrel outside half 22 so that a portion of the gasket engages the alignment ring as shown in FIG. 8, thereby properly centering the mandrel halves and gasket relative to one another. The coil threaded nut 26 is tightened sufficiently to hold the gasket retainer cross 22a and hence the gasket in the bent in position. The casting operation is then performed in a conventional manner, the assembly of FIG. 8 being arranged within a suitable mold assembly.

The mandrel member 16, shown in FIG. 3, may be eliminated and the coil thread member 28 may be directly secured to an inside core 30 of a mold assembly having a swingable jacket 32 opposing wall 30 (see FIG. 10). The gasket 12 is placed upon mandrel 14 in the same manner as shown in FIG. 3. The sleeve portion 12d is pushed down during the insertion operation, resting against the cross member 26, as shown in FIG. 10. The mandrel with the gasket fitted thereto is then placed inside the mold assembly so that the coil thread 28 passes through opening 26a in crossmember 26. The mandrel and gasket are retained in position by threading the coil thread nut 34, arranged along the interior surface of core mold member 30, onto the coil thread 28, the fully assembled and mounted position being shown in FIG. 11. The coil thread 28 serves to substantially position and center the gasket within the mold, assembly. The hinged, swingable jacket member 32 is closed in the manner shown in FIG. 11. The gasket is seated against the inside core, eliminating the need for an inside mandrel. The cast material (concrete) is poured into the mold and, after the cast material has set and is cured, the mold is opened, nut 34 is removed and the mandrel is typically removed by conventional means, such as a slide hammer (not shown for purposes of simplicity).

FIG. 12 shows the finished cast member with the gasket embedded therein. A pipe P is passed through the sleeve portion and a stainless steel take-down clamp C is arranged within the recess provided between the two annular beads 12$f$ and 12$g$ on the boot portion 12$d$. It should be understood that when the mandrel incorporating the cross member is removed from the mold assembly, the gasket sleeve portion returns to the normal, in-use. position, shown in FIG. 12.

Figure 13A:
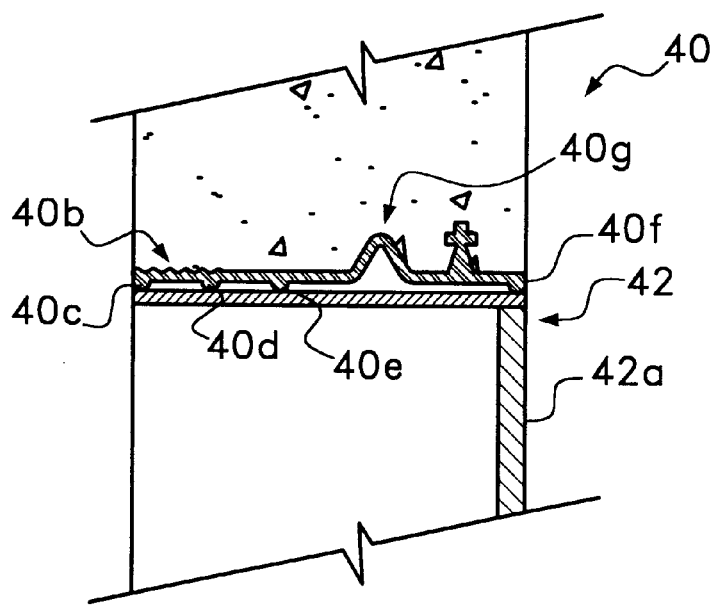
FIG. 13a shows a sectional view of another preferred embodiment showing a mandrel and a gasket mounted thereon in readiness for producing a cast member.
Figure 13B:
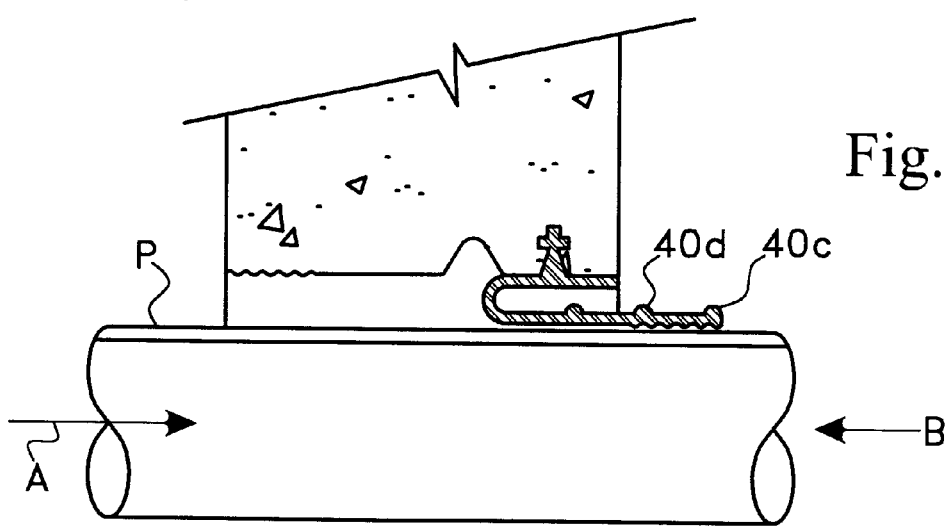
FIG. 13b shows the manner in which the gasket, employing the mandrel of FIG. 13a is embedded in a cast member and the manner in which the gasket receives and forms a fluid-tight joint with a pipe inserted therethrough.
Figure 13C:
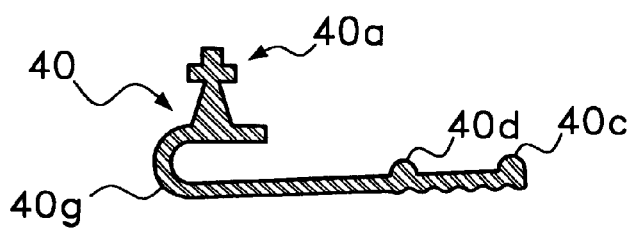
FIG. 13c is a sectional view of the gasket of FIGS. 13a and 13b showing the manner in which the gasket is extruded to facilitate roll-out of the gasket preparatory to use.

FIGS. 13$a$ and 13$b$ show still another embodiment of the present invention which utilizes a one-piece mandrel.

The gasket 40 is a molded or extruded, one-piece, annular-shaped gasket having an annular integral embedment portion 40$a$ of a substantially T-shaped cross-section along the external surface thereof. At an end of the gasket opposite embedment portion 40$a$ a saw-tooth configuration is molded (or extruded) into the surface of the gasket at 40$b$, also bn the external surface of the gasket. An annular-shaped "hump" 40$g$ is formed in the gasket 40 to facilitate rollover of the gasket when it is pushed through the gasket in readiness to receive a pipe. More particularly, the gasket 40 is preferably extruded in the shape shown in FIG. 13$c$. The gasket is then cut to size, and the ends are joined to form an annular, closed-loop gasket.

The internal periphery of the gasket is provided with four (4) integral, annular projections or "raised surfaces" arranged at spaced intervals along the inner surface thereof. These annular-shaped, raised surfaces extend radially, inwardly toward the center of the gasket, as shown in FIG. 13$a$. The annular projections 40$e$ and 40$f$ may, however, be omitted.

In order to form a cast member, the gasket is stretched and pulled over a unitary, one-piece mandrel member 42 which is cylindrical in shape and of a constant diameter. The rounded "hump" 40$g$ in the gasket retains its configuration even after the gasket is stretched over the mandrel, as shown in FIG. 13$b$.

The molding operation is similar to those described hereinabove. The integral, annular projections 40$c$–40$f$ provided as part of the gasket are of uniform thickness and serve to maintain the main body of gasket 40 a constant distance from the outer periphery of the mandrel (except for hump 40$g$).

When the jacket of the mold assembly is closed, the cast material is poured into the mold assembly to form the cast member. After the cast material has been set and cured, the mandrel assembly is pulled out of the cast member and the gasket may reside in the position shown in FIG. 13$a$ until it is ready for installation at a job site, at which time the gasket is pulled to the position shown in FIG. 13$b$ for connection with a pipe P which is passed through the annular gasket in the direction shown by arrow A or B. The "hump" 40$g$ greatly facilitates the rolling out of the gasket from the position shown in FIG. 13$a$ to the position shown in FIG. 13$b$. After the pipe reaches the position shown in FIG. 13$b$, a suitable clamp, such as, for example, the stainless steel take-down clamp C, shown in FIG. 12, is positioned between raised projections 40$c$, 40$d$ and is tightened to form a positive, water-tight joint therebetween.

FIGS. 14–14$c$ show still another embodiment of the present invention employing gasket 50 which is a molded gasket. Gasket 50 is molded so that it assumes the configuration shown in FIG. 14, upon completion of the molding process. Gasket 50 has an integral, annular embedment portion 50 having a substantially T-shaped cross-section 50$a$. The embedment portion 50$a$ merges with a conical-shaped boot portion 50$b$ at a curved shoulder 50$h$ and terminates in a cylindrical-shaped pipe attachment portion 50$c$ having a serrated or V-shaped surface portion 50$d$ arranged about its outer periphery when in the configuration shown in FIG. 14 and is further provided with a pair of integral, spaced apart annular, substantially semi-circular projections 50$e$, 50$f$, which define a recess 50$g$ therebetween for a purpose to be described hereinbelow.

The manner in which the cast member is molded utilizing the gasket 50 is through the employment of a substantially conical-shaped mandrel assembly 52 which is substantially hollow and is provided with a cross bar 52$a$ for securement to a jacket 32 (see also FIG. 10) provides suitable fastening means 54.

The mandrel has a first hollow, truncated, conical section 52$b$ and a second hollow, truncated, conical section 52$c$ molded, machined or otherwise formed so as to provide an annular shoulder 52$d$ at the junction point between the truncated, conical portions 52$b$ and 52$c$. The narrow diameter end of section 52$b$ is greater in diameter than the larger diameter end of section 52$c$, to define the shoulder 52$d$.

The gasket is arranged upon the mandrel assembly by pulling the free end thereof to the left relative to FIG. 14$a$ so as to assume the configuration shown in FIG. 14$a$. The gasket is mounted upon mandrel 52 so that the "pulled through" portion thereof is arranged within the hollow interior of the mandrel 52 and further so that the annular shoulder 52$d$ engages the shoulder 50$h$ where the embedment portion 50$a$ joins the boot portion 50$b$ of the gasket. Shoulder 52$d$ serves as a positioning means for properly positioning the gasket upon the mandrel 52 a given spaced distance inward from the core and jacket members forming the mold assembly.

With the gasket in proper position on the mandrel, as shown in FIG. 14$b$, jacket 32 is swung to the closed position urging the "bend" B in gasket 50 to be at least slightly compressed between the right-hand annular edge 52$e$ of the mandrel 52 and the adjacent surface of core 30 (see also FIG. 10). The gasket makes firm contact with the surface of core 30 at bend B, preventing the cast material, when poured into the mold assembly, from entering into the region defining the opening in the cast member.

The cast material is then poured into the mold assembly and, after the cast material has set and cured, the jacket 32 is swung to the open position, pulling the mandrel 52 out of the cast member.

Thereafter, the gasket may either be maintained in the position shown in FIG. 14$b$ until it is ready for use, or alternatively, may be pulled to the position shown in FIG. 14$c$ in readiness for receiving a pipe P which is put through the opening and through gasket 50 to the dotted-line position, shown in FIG. 14$c$. This can be done in either position. A take-down clamp, such as the take down clamp C, shown in FIG. 12, is placed in, the recess 50$g$ which is now an external periphery, in order to form a good water-tight joint between the gasket and the pipe. The serrated or saw-tooth surface 50$d$, which engages the outer surface of pipe P, enhances the water-tight seal between the gasket and the pipe.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. In combination, a gasket and a mold assembly having a mandrel for supporting and aligning the gasket in the mold assembly during a casting operation, said gasket comprising:

a hollow, annular-shaped molded boot having an embedment end, a pipe attachment end and a joining portion extending between said embedment end and said pipe attachment end;

said pipe attachment end having a diameter smaller than a diameter of said embedment end;

said embedment end having an integral, annular-shaped embedment portion having a substantially T-shaped, cross-section extending radially outwardly from said boot for embedment into a cast member;

said boot being molded to assume a configuration in which said embedment portion lies in a plane perpendicular to a central axis of said gasket and said joining portion extends away from said plane, said pipe attachment end being axially displaced in a first direction away from said embedment portion, said joining portion having an annular bend where the joining portion merges with said embedment portion; and said mandrel for supporting said gasket during casting having a surface conforming to an interior surface of said boot and being provided with an annular positioning shoulder engaging said annular bend to properly position the gasket in the mold assembly for molding the cast member;

said mandrel being comprised of first and second truncated, conical-shaped sections each having a smaller diameter end and a larger diameter end, the smaller diameter end of said first section being joined to the larger diameter end of said second section, the diameter of the smaller diameter end of said first section being greater than the diameter of the larger diameter end of said second section to form said annular positioning shoulder at the junction thereof for engaging said annular bend for accurately positioning said embedment portion within said mold assembly.

* * * * *

UNITED STATES PATENT AND TRADEMARK OFFICE
CERTIFICATE OF CORRECTION

PATENT NO.  : 6,568,691 B1
DATED       : May 27, 2003
INVENTOR(S) : Westhoff et al.

It is certified that error appears in the above-identified patent and that said Letters Patent is hereby corrected as shown below:

Column 1,
Lines 37-38, after the word "material", delete "typically concrete)" and insert therefor -- (typically concrete) --.

Column 2,
Line 3, after the word "suitable", delete "rub" and insert therefor -- rubber --.

Column 6,
Line 59, delete "crossmember" and insert therefor -- cross member --.

Column 7,
Line 22, after the word "also", delete "bn" and insert therefor -- on --.

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,568,691 B1
DATED : May 27, 2003
INVENTOR(S) : Westhoff et al.

It is certified that error appears in the above-identified patent and that said Letters Patent is hereby corrected as shown below:

Column 4,
Line 4, after the word "a", delete "base", and insert therefor -- tapered --.
Line 5, after the word "12a", delete "of a tapered configuration, in cross section" and insert therefor -- arranged on base portion 12b --.
Line 11, delete "Tapered" and insert therefor -- Base --.
Line 11, after the word "portion", delete "12a" and insert therefor -- 12b --.
Line 11, after the word "a", delete "base" and insert therefor -- curved --.
Line 12, after the word "portion", delete "12b which extends toward the right" and insert therefor -- 12c --.
Line 59, after the word "inner", insert -- (IM) --.
Line 59, after the word "outer", insert -- (OM) --.

Column 5,
Line 56, after the word "convolutions", delete "12I" and insert therefor -- 12i --.

Column 6,
Line 27, after the word "22" delete "(outside half)", and insert therefor -- (outside half - Figure 7a) --.
Line 52, after the word "32", insert -- and --.

Column 7,
Line 30, after the phrase "raised surfaces", insert -- 40c-40f --.

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,568,691 B1 Page 1 of 1
APPLICATION NO. : 09/533424
DATED : May 27, 2003
INVENTOR(S) : Westhoff et al.

It is certified that error appears in the above-identified patent and that said Letters Patent is hereby corrected as shown below:

At column 6, lines 27-28, after the word "24" delete "(inside half)", and insert therefor --(inside half - Figure 7b)--.

Signed and Sealed this

Sixth Day of November, 2007

JON W. DUDAS
*Director of the United States Patent and Trademark Office*